Dec. 23, 1969  J. C. ENGEL  3,486,070
SOLID-STATE CONSTANT POWER BALLAST FOR
ELECTRIC DISCHARGE DEVICE
Filed April 29, 1968

WITNESSES
Helen M. Farkas
James F. Young

INVENTOR
Joseph C. Engel
BY W. D. Palmer
ATTORNEY

United States Patent Office 3,486,070
Patented Dec. 23, 1969

3,486,070
SOLID-STATE CONSTANT POWER BALLAST FOR ELECTRIC DISCHARGE DEVICE
Joseph C. Engel, Pittsburgh, Pa., assignor to Westinghouse Electric Corporation, Pittsburgh, Pa., a corporation of Pennsylvania
Filed Apr. 29, 1968, Ser. No. 724,697
Int. Cl. H05b 37/02, 39/04, 41/36
U.S. Cl. 315—225                                    6 Claims

ABSTRACT OF THE DISCLOSURE

Solid-state, constant-power ballast and lamp combination wherein the lamp is continuously and alternately operated in two circuits. When the lamp is operated in the first of the two circuits, the current through the lamp rises. When the lamp is operated in the second of the two circuits, the current through the lamp falls. A current-actuated switch senses a predetermined maximum desired current through the lamp and switches the operation of the lamp from the first circuit to the second circuit. The lamp operates in the second circuit until a predetermined time interval has elapsed, at which time the operation of the lamp is switched back to the first circuit. This mode of operation minimizes the effects of any changes in lamp operating characteristics and the power consumed by the lamp.

BACKGROUND OF THE INVENTION

This invention relates to a solid-state ballast combination for a discharge device and, more particularly, to a solid-state ballast and lamp combination wherein the power input to the lamp is regulated.

Discharge devices, such as high pressure mercury and related lamps, operate with what is known as a negative volt-ampere characteristic, wherein the heavier the current through the lamp the lower the resistance. This necessitates the use of a ballasting or current-limiting means, in order to enable the lamp to be operated. In the case of a fluorescent lamp, the usual ballast is designed as a high reactance transformer which provides a high starting voltage for the lamp and thereafter provides a current limiting function. Somewhat similar transformer ballasts are normally used in conjunction with high-pressure mercury-vapor and related lamps.

Reactive ballasts are relatively bulky and the power input to the lamp will vary somewhat with variations in lamp voltage. Particularly with some newer types of light sources, such as the so-called mercury-additive-metal-halide lamps and lamps utilizing polycrystalline alumina arc tubes, the lamp operating voltage tends to change throughout lamp life.

The prior art has recognized the need for solid-state ballasts and in Patent No. 3,222,572, dated Dec. 7, 1965, is disclosed a solid-state ballast which senses a maximum current as well as a minimum current through the lamp in order to switch the operation of the lamp from one circuit to another and thus effect a ballasting of same. Another method for switching to effect a ballasting action is disclosed in U.S. Patent No. 3,265,930 dated Aug. 9, 1966, wherein a DC chopper circuit is used to ballast the lamp and the control for the DC chopper is effected by a switch which is responsive to maximum lamp current and minimum lamp current or an equivalent lamp operating condition.

SUMMARY OF THE INVENTION

It is the general object of this invention to provide a ballast and a discharge device combination which is simple and positive in construction and wherein the power input to the discharge device is carefully controlled.

It is a further object to provide an improved ballast apparatus wherein variations in the operating characteristics of the discharge device which is ballasted are compensated for in order to maintain the power input to the device relatively constant.

The aforesaid objects of the invention, and other objects which will become apparent as the description proceeds, are achieved by providing a first inductor-ballasted circuit which includes the discharge device as a component thereof, with the first circuit adapted to operate the device with a rising current therethrough. A second inductor-ballasted circuit is also provided and includes the device as a component thereof and the second circuit is adapted to sustain the operation of the device for a short period of time but with a falling current through the ballasted device. A switch is operable to effect a switching of the operation of the device from the first circuit to the second circuit, and also from the second circuit to the first circuit. A current sensing means is responsive to a predetermined maximum current input to the device when operation is in the first circuit, in order to cause the operation of the device to switch from the first circuit to the second circuit. This switching action triggers a time delay mechanism so that after a set period of time, the operation of the device is switched from the second circuit back to the first circuit. By this mode of operation, the effect of any voltage variations across the device as are required to operate same are compensated for so that the average power input to the device is substantially that at which the device is intended to operate.

BRIEF DESCRIPTION OF THE DRAWINGS

For a better understanding of the invention, reference should be made to the accompanying drawings, wherein.

DESCRIPTION OF THE PREFERRED EMBODIMENTS

Figure 1:
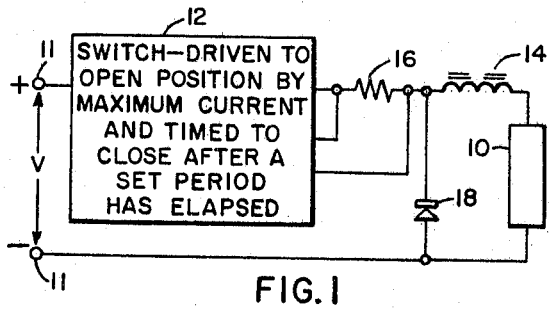
FIG. 1 is a diagrammatic view of the basic circuit which incorporates the lamp as a component thereof in accordance with the present invention.

With specific reference to the form of the invention illustrated in the drawings, in FIGURE 1 is shown a diagrammatic view of the basic operating circuit wherein the lamp 10 is a conventional type of discharge device such as a high-pressure mercury-vapor lamp, or a high-pressure mercury-metal-halide-additive lamp, or a lamp which utilizes a polycrystalline alumina arc tube which encloses a sodium and mercury fill. A conventional fluorescent lamp could also be utilized in this circuit which is adapted to be connected across a source of DC potential (V) by input terminals 11. A switch 12 is driven to open position by sensing a maximum current through the lamp 10 and the open switch is timed to close after a predetermined set period has expired. When the switch is in a closed position, current proceeds through the switch 12, the ballasting and energy storage inductor 14, through the lamp 10, and through the current detecting impedance 16. The relative impedance values of the inductor 14 and lamp 10 are such that when the switch 12 is closed, the current through this formed first circuit will rise and if some other ballasting measures were not taken, the lamp 10 would normally be destroyed within a short period. The rising current is detected by the impedance means 16 and when the voltage drop across the impedance 16 has achieved a predetermined value, the switch 12 is opened. The lamp is then operated from the energy stored in the inductor 14 with the circuit completed by the diode 18, which forms a closed loop with the inductor 14 and lamp 10. The second circuit formed by this closed loop is such that it will sustain the operation of the lamp 10 for a short period of time, but with a falling current therethrough. After a predetermined set period of time, the switch 12 is closed and its closing is effected by a time delay means which is initially triggered by the opening of the switch 12. As will be explained hereinafter, this effects a close control over variations in lamp operating voltage, in order to achieve a constant power input to the lamp.

Figure 2:
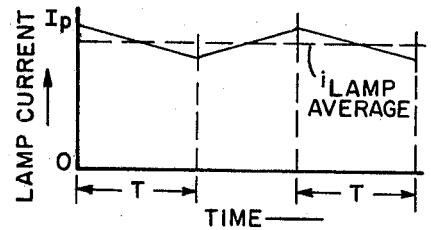
FIG. 2 is a graph of lamp current versus time illustrating how the lamp current varies as the operation of the lamp is alternately switched from a first circuit to a second circuit, and from the second circuit to the first circuit.

In FIG. 2 is shown a graph of lamp current versus time illustrating the variations in current which are encountered as the switch 12 opens and closes. During the period which the switch is open, identified as the time T in FIGURE 2, the operation of the lamp is maintained with a falling current from the energy which is stored in the inductor 14. The average lamp current is equal to:

(1) $$i_{Lamp\,(Avg.)} = I_{peak} - \frac{E}{L}\frac{T}{2}$$

The lamp power of course is equal to the lamp voltage E times the average lamp current or:

(2) $$P_{Lamp} = E i_{lamp\,(Avg.)} = \left(I_p - \frac{E}{L}\frac{T}{2}\right)E$$

In the foregoing formulas, E is equal to the operating voltage across the lamp, L is the value of inductance of the inductor 14 and T is the predetermined set period of time during which the switch 12 is opened. An examination of the foregoing formulas will show that if $I_p$, T and L are fixed, the lamp power will be substantially independent of the supply voltage V, since the voltage drop across the lamp E is normally dependent upon the current through the lamp. There is a tendency for the voltage across the lamp to vary somewhat, however, due to different ambient conditions or aging of the lamp, particularly in the case of some of the newer types of discharge devices.

An examination of the foregoing formulas will disclose that if E is increased due to aging of the lamp, the average lamp current will be decreased, since the peak current ($I_p$) has the value $$\left(\frac{E}{L}\frac{T}{2}\right)$$

subtracted therefrom to determine the average lamp current. This will tend to maintain the lamp wattage constant so that the lamp will operate with the input wattage for which it is designed.

The foregoing mode of operation is to be contrasted with a feedback device which senses both maximum and minimum desired current in order to effect the switching, as disclosed in the aforementioned Patents 3,222,572 and 3,265,930. If both maximum and minimum current are sensed, the wattage consumed by the lamp will be expressed by the formula:

$$P_{lamp} = \frac{E(I_{max.} - I_{min.})}{2}$$

Since the maximum current sensed and minimum current sensed are established, an increase in the voltage drop (E) across the lamp will increase the power consumed by the lamp proportionately and, alternatively, a decrease in voltage drop (E) will cause the lamp power input to decrease. Such a variation in lamp power with lamp operating voltage is corrected for by the ballasting combination of the present invention.

The foregoing Formula 2 discloses that a relatively large ripple current is desirable to minimize any dependency of lamp power on lamp voltage, since the greater the value of T, the greater the correction factor for any increase or decrease in E. As a matter of practicality, it is desirable that the value of T be at least 200 microseconds, although certainly there will be substantial correction for variations in lamp operating voltage (E) or supply voltage (V) if T is less than this value. In addition, while the foregoing has been shown for DC operation, the same effects will be achieved for AC operation, namely, a correction in power input to the lamp to compensate for variations in line voltage or lamp operating voltage.

Figure 3:
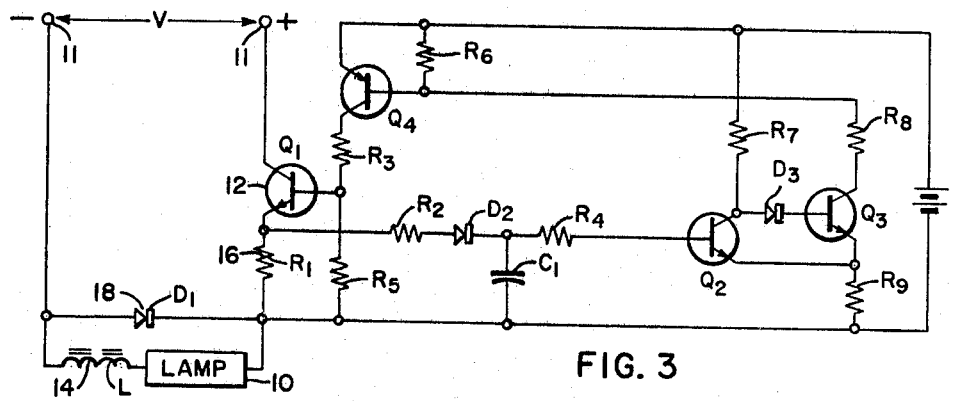
FIG. 3 is a circuit diagram for a preferred operating circuit of the present invention.

In FIGURE 3 is shown a ballasting circuit which automatically limits the input current to a predetermined value of $I_{peak}$ and which provides a constant off time T for the switch 12. The switch 12 comprises a transistor $Q_1$. Transistors $Q_2$ and $Q_3$ form a Schmitt trigger switching circuit which determines whether or not $Q_1$ is on or off. If $Q_2$ is "off," $Q_3$ is "on" and $Q_4$ is "on." Transistor $Q_4$ provides base drive for $Q_1$ in order to maintain $Q_1$ "on."

When $Q_1$ is "on," the input current to the lamp 10 will rise nearly linearly as shown in FIG. 2. This current is sensed by a current shunt $R_1$ which feeds the current peak detecting circuit formed by $R_2$, $R_4$ and $D_2$. The resistor $R_2$ is used to filter the large spike recovery current of $D_1$ from the peak detecting circuit. When the voltage on $C_1$ reaches a large enough value, $Q_2$ is turned "on" and $Q_1$ is consequently turned "off." With $Q_1$ "off," the voltage across $R_1$ is zero. Capacitor $C_1$ is then discharged through $R_4$ into the base of $Q_2$. Transistor $Q_2$ is then "on" and transistor $Q_1$ is "off," for a predetermined constant period of time which is determined by the discharge time of $C_1$. The peak detector therefore not only limits the input current to a predetermined maximum value, $I_p$, but also provides the constant time off time T for the chopper switch.

To complete the description of the foregoing circuit, $R_7$, $R_8$, and $R_9$ form a part of the conventional Schmitt trigger circuit, $R_6$ is a shunt resistor to provide a path for the collector leakage current of $Q_3$. $R_3$ is a current limiting resistor and $R_5$ is a bias resistor. As a specific example, to operate a mercury lamp having a rated power input of 400 watts from a 340 v.d.c. power source, the predetermined maximum lamp current ($I_p$) which triggers the Schmitt trigger circuit is set at 3.5 amperes. The predetermined "off" time (T) is 250 microseconds. The discharge time of $C_1$ is made short compared to the decay of the circulating current which is flowing through $D_1$ and the lamp. As a result, when $Q_1$ is switched "on," the lamp current has not decayed appreciably.

Summarizing the operation of the foregoing circuit, the lamp and inductor comprise a first inductor-ballast circuit which is adapted to operate the lamp with a rising current. When the transistor $Q_1$ is "off," the diode $D_1$, the lamp 10 and the inductor 14 form an inductor-ballast second circuit which is adapted to sustain operation of the lamp for a short period of time with a falling current. The transistor switch $Q_1$ comprises a switching means which is operable to switch the operation of the lamp from the first circuit to the second circuit, and also to switch the operation of the lamp from the second circuit to the first circuit. The current sensing resistor $R_1$ is responsive to a predetermined maximum current input to the lamp, when the lamp is operated directly from the DC supply source, V, and functions with the Schmitt trigger and associated circuitry to switch the operation of the lamp from the first circuit to the second circuit. The capacitor $C_1$ and resistor $R_4$ constitute a time delay means which is triggered by the switching of the operation of the lamp 10 from the first circuit to the second circuit and thereafter, the time delay means measures a predetermined set period of time before causing the transistor $Q_1$ to switch the operation of the lamp 10 from the second circuit back to the first circuit.

It should be clear that the diode $D_1$ can be replaced by any equivalent unidirectional current conductor connected in parallel with the series-connected lamp 10 and inductor 14. The current sensing means, which in the example is formed as a resistor $R_1$ can be replaced by other impedance or a current sensing device such as the current transformer. In the preferred apparatus as shown, the primary switch $Q_1$ is actuated by additional switching means which constitute the Schmitt trigger circuit and associated circuitry. In addition, other time delay means can be substituted for the capacitor $C_1$ and associated resistor $R_4$ which in the preferred form of the invention constitutes a voltage-responsive device which controls the Schmitt trigger.

Figure 4:
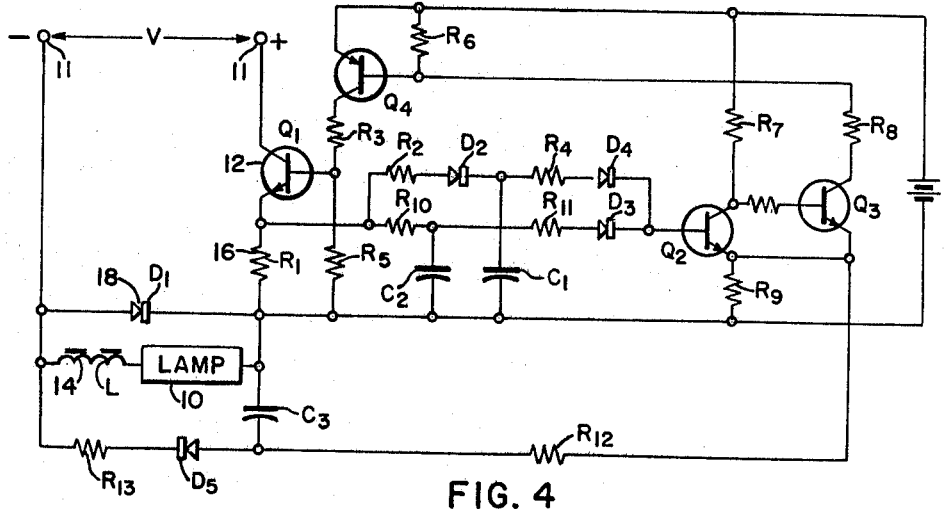
FIG. 4 is a circuit diagram of an alternative operating and ballasting circuit.

The foregoing basic circuit can be used in a modified ballast circuit to provide for control during lamp warm-up, after which a "parallel" control which monitors average lamp current overrides to control the operation of the lamp. Such a circuit is shown in FIG. 4 and is designed for operation from a rectified 240 volt AC supply. The circuit as shown in FIG. 4 is similar to that shown in FIG. 3 and components which serve a similar function are provided with a corresponding indicia. A current peak detecting circuit is formed by $R_2$, $R_4$, $D_2$ and $C_1$. The input resistor $R_2$ together with capacitor $C_1$ forms a low-pass filter which makes the peak-current-detector circuit insensitive to short duration input current pulses and this filtering is desirable to prevent the recovery current of $D_1$, which flows when $Q_1$ is turned on, from switching the Schmitt trigger circuit.

When the output of the peak-current-detector circuit reaches the value large enough to turn $Q_2$ "on," the trigger circuit switches and $Q_1$ is turned "off." With $Q_1$ turned "off," the charge on $C_1$ will be discharged into the base of $Q_2$ through $R_4$. The "on" time of $Q_2$ is determined by the discharge time of $C_1$, which is constant. Thus when $Q_1$ is turned off, it remains off for a fixed time. The "on" time of $Q_1$ is determined by the time required for the peak input current to reach the trip point. During lamp warm-up, when the peak-current-detecting circuit is controlling the input current, the controls for the circuit operate in variable-pulse-frequency mode.

As noted, the voltage developed across the lamp during warm-up is relatively low and the voltage developed across $C_2$ during lamp warm-up is quite low since the "on" time of $Q_1$ is quite short, for example 30 microseconds. After the lamp is warmed up and has achieved steady-state operating conditions, the voltage developed across $C_2$ is increased and exceeds the voltage developed across $C_1$. After this occurs, the average-current-detecting circuit formed by $R_{10}$, $R_{11}$, and $C_2$ controls the lamp operation and the switching of the Schmitt trigger. The long time-constant of the low pass filter formed by $R_{10}$ and $C_2$, for example >1000 microseconds, makes the voltage on $C_2$ proportional to the average input current. When the voltage reaches a value sufficient to turn $Q_2$ "on," $Q_1$ is turned "off" and remains off while $C_2$ discharges to a point sufficient that $Q_1$ is turned "on." The discharge time of $C_2$ is made short compared to the decay of the circulating current which is flowing through $D_1$ and the lamp, so that when $Q_1$ is turned back "on," the lamp current is not decayed appreciably.

Summarizing the operation of the current-control portions of the circuit as shown in FIG. 4, the peak-current-detecting or sensing circuit, which includes the capacitor $C_1$, has an average-current-sensing circuit, which includes the capacitor $C_2$, connected in parallel therewith. The average-current sensing capacitor $C_2$ has a voltage developed thereacross which is proportional to the average current through the lamp 10. When the lamp 10 has warmed up, and thus achieves steady-state operating conditions, the voltage developed across the average-current-sensing capacitor $C_2$ exceeds the voltage developed across the peak-current-sensing capacitor $C_1$ and the operation of the device is controlled by the average-current-sensing control.

As a further improvement for such a modified circuit, the network formed by $R_{12}$, $R_{13}$, $C_3$ and $D_5$ is used to vary the average input current should the supply voltage vary. This is desirable in this circuit in order to maintain the lamp power constant of a $\pm 10\%$ variation in supply voltage. This control circuit operates in such manner that the voltage detecting circuit formed by $C_3$, $D_5$ and $R_{13}$ makes the voltage on $C_3$ proportional to the input supply voltage. Since this voltage is quite large compared to the voltage across $R_9$, the current through $R_{12}$ is proportional to the supply voltage. This current is made equal to the current through $R_9$ when $Q_3$ is conducting. The current which flows through $R_8$ is thus divided evenly between $R_9$ and $R_{12}$. If the supply voltage increases 10%, the current in $R_{12}$ also increases by 10%. Because the current in $R_8$ is nearly constant, the current in $R_9$ will decrease approximately 10%. Accordingly, the voltage developed across $R_9$, and thus the trip level of the Schmitt trigger circuit, will decrease accordingly. A decrease in trip level produces a corresponding decrease in the average input current. As a consequence, a 10% decrease in supply current, so that the input power to the lamp 14 is always substantially constant.

Summarizing the operation of the voltage-compensating circuit, the current shunt $R_{13}$, $D_5$ and $C_3$ is connected in parallel with the lamp 10. This shunt is electrically connected to the Schmitt trigger circuit through $R_{12}$. During operation, the capacitor $C_3$ has developed thereacross a potential which is proportional to the supply potential. When the supply potential is increased or decreased to more than its rated value, the trip level of the Schmitt trigger circuit is decreased or increased, respectively, to maintain the wattage input to the device substantially constant.

It will be recognized that the objects of the invention has been achieved by providing an improved ballast for discharge devices which operates to maintain the input wattage to the discharge device substantially constant, even though the operating parameters for the discharge device vary and even though the supply voltage varies.

While preferred embodiments of the invention have been illustrated and described in detail, it is to be particularly understood that the invention is not limited thereto or thereby.

I claim:

1. In combination with a discharge device which is designed to be operated with a predetermined average power input from a power source of predetermined rating, an improved apparatus adapted to be connected to said power source for controlling the average electrical power input to said device, said apparatus comprising:
    (a) a first inductor-ballasted circuit means including said device as a component thereof, said first circuit means adapted to operate said device with a rising current therethrough;
    (b) a second inductor-ballasted circuit means including said device as a component thereof said second circuit means adapted to sustain operation of said device for a short period of time with a falling current therethrough;
    (c) switching means operable to switch the operation of said device from said first circuit means to said second circuit means, and said switching means also operable to switch the operation of said device from said second circuit means to said first circuit means;
    (d) sensing means responsive to a predetermined maximum current input to said device when said device is operated by said first circuit means to cause said switching means to switch the operation of said device from said first circuit means to said second circuit means;
    (e) time delay means triggered by the switching of the operation of said device from said first circuit means to said second circuit means, said time delay means after being triggered measuring a predetermined set period of time and then causing said switching means to switch the operation of said device from said second circuit means to said first circuit means whereby said device is operable to be continuously energized alternately in said first circuit means and in said second circuit means at the average power input for which said device is designed to operate.

2. The improved apparatus combination as specified in claim 1, wherein said power source is a DC source, said first circuit means comprises an inductor means in series circuit with said device and adapted to be connected across said DC source through said switching means, said second circuit means comprising a closed loop formed by said inductor means and said device together with a unidirectional current control means which is connected in parallel with said device and said inductor means, said switching means having an open position and a closed position, said switching means when closed connecting said device in said first circuit means, and said switching means having an open position when said device is connected in said second circuit means.

3. In combination, a discharge device and the control source therefor, said combination comprising:
 (a) said control source having input terminals adapted to be connected to a source of unidirectional potential;
 (b) a current limiting-power storage inductor and a primary switching means conected in series with said device, and said series-connected lamp and inductor and primary switching means connected across said input terminals, said primary switching means having an open position and a closed position to open and close the circuit to said device and series-connected inductor, and unidirectional current conducting means connected in parallel with said series-connected device and inductor to form a current conduction loop when said primary switching means is in open position;
 (c) current sensing means connected in series circuit with said device and said switching means, and when said switching means is in a closed position, said current sensing means having developed therein a signal which is proportional to the current drawn by said device; and
 (d) control means connected to said current sensing means and operable to open and close said primary switching means, said control means comprising:
  (1) additional switching means connected to said current sensing means and responsive to a predetermined signal therefrom which corresponds to a maximum desired current through said discharge device to open said primary switching means, and
  (2) time delay means triggered by the opening of said primary switching means and operable to close said primary switching means when a predetermined period of time has elapsed after said time delay means is triggered.

4. The combination as specified in claim 3, wherein said current sensing means is an impedance means, said impedance means having a voltage developed thereacross which is proportional to the current drawn by said device when said primary switching means is in a closed position, said control means comprising a peak-current-sensing means including a capacitor connected across said impedance means, and chargeable by the voltage developed across said impedance means when said primary switching means is in a closed position, and said peak-current-sensing capacitor comprising said time-delay means and dischargeable at a predetermined constant rate when said primary switching means is in an open position, said additional switching means including a voltage-responsive means actuated by the voltage developed across said peak-current-sensing capacitor to open said primary switching means when the voltage developed across said impedance means reaches a predetermined value, and said additional switching means actuated to close said primary switching means when the voltage across said peak-current-sensing capacitor decreases to a predetermined value.

5. The combination as specified in claim 4, wherein an average-current-sensing means comprising an average-current-sensing capacitor is connected in parallel with said peak-current-sensing means, said average-current-sensing capacitor having a voltage developed thereacross which is proportional to the average current through said device, and the voltage developed across said average-current-sensing capacitor exceeding the voltage developed across said peak-current-sensing capacitor after said device is operating under steady-state conditions.

6. The combination as specified in claim 5, wherein said additional switching means is a transistor switching means responsive to the voltage developed across said average-current-sensing means to switch said primary switching means, and additional current shunt paralleling said device and including in circuit therewith a current-shunt capacitor having a potential developed thereacross which is proportional to the supply potential, said current shunt electrically connected to said transistor switching means, and an increase or decrease in supply potential correspondingly decreasing or increasing the potential required to cause said transistor-switching means to switch, whereby any increase in supply potential is offset by a decrease in average current supplied to said device, and vice-versa.

References Cited

UNITED STATES PATENTS

| | | | |
|---|---|---|---|
| 2,958,806 | 11/1960 | Lord | 315—100 |
| 3,080,503 | 3/1963 | Brooks | 315—187 |
| 3,265,930 | 8/1966 | Powell | 315—209 |
| 3,336,501 | 8/1967 | Segawa | 315—105 |

JOHN W. HUCKERT, Primary Examiner

SIMON BRODER, Assistant Examiner

U.S. Cl. X.R.

315—209, 224, 238